(12) United States Patent
Shental et al.

(10) Patent No.: US 12,489,500 B2
(45) Date of Patent: Dec. 2, 2025

(54) IN-NETWORK DISTRIBUTED PROCESSING FOR PRECODING AND LINEAR DETECTION

(71) Applicant: QUALCOMM Incorporated, San Diego, CA (US)

(72) Inventors: Ori Shental, Marlboro, NJ (US); Ashwin Sampath, Skillman, NJ (US); Junyi Li, Fairless Hills, PA (US); Thomas Joseph Richardson, South Orange, NJ (US)

(73) Assignee: Qualcomm Incorporated, San Diego, CA (US)

( * ) Notice: Subject to any disclaimer, the term of this patent is extended or adjusted under 35 U.S.C. 154(b) by 414 days.

(21) Appl. No.: 17/655,319

(22) Filed: Mar. 17, 2022

(65) Prior Publication Data
US 2023/0299828 A1    Sep. 21, 2023

(51) Int. Cl.
*H04B 7/06* (2006.01)
*H04B 7/0456* (2017.01)

(52) U.S. Cl.
CPC ......... *H04B 7/0626* (2013.01); *H04B 7/0456* (2013.01); *H04B 7/0639* (2013.01)

(58) Field of Classification Search
None
See application file for complete search history.

(56) References Cited

U.S. PATENT DOCUMENTS

| | | |
|---|---|---|
| 2010/0034146 A1 | 2/2010 | Hou et al. |
| 2011/0222625 A1 | 9/2011 | Clerckx et al. |
| 2013/0089159 A1* | 4/2013 | Liu ................. H04B 7/026 375/267 |
| 2013/0094384 A1 | 4/2013 | Park et al. |
| 2014/0169490 A1 | 6/2014 | Medbo et al. |
| 2021/0226671 A1 | 7/2021 | Vermani et al. |
| 2022/0109479 A1* | 4/2022 | Liu ................. H04B 7/0617 |
| 2022/0279535 A1* | 9/2022 | Tsui ................. H04L 5/14 |
| 2022/0311489 A1* | 9/2022 | Rakib ............... H04B 7/0452 |
| 2022/0321179 A1* | 10/2022 | Mungara .......... H04B 7/024 |
| 2024/0048194 A1* | 2/2024 | Mukherjee ....... H04B 1/0032 |

OTHER PUBLICATIONS

International Search Report and Written Opinion—PCT/US2023/062466—ISA/EPO—Jun. 7, 2023.

* cited by examiner

*Primary Examiner* — Luna Weissberger
(74) *Attorney, Agent, or Firm* — Harrity & Harrity, LLP

(57) ABSTRACT

Various aspects of the present disclosure generally relate to wireless communication. In some aspects, a first node may transmit a set of first values indicating a first estimated value at the first node and a first reliability value associated with the first estimated value, the set of first values being based at least in part on channel state information (CSI) associated with the first node and a set of user equipments (UEs). The first node may receive, from a set of second nodes, a set of second values indicating a second estimated value at the second node and a second reliability value associated with the second estimated value. The first node may transmit, to the set of second nodes, a set of third values indicating a third estimated value at the first node and a third reliability value associated with the third estimated value. Numerous other aspects are described.

30 Claims, 8 Drawing Sheets

IN-NETWORK DISTRIBUTED PROCESSING FOR PRECODING AND LINEAR DETECTION

FIELD OF THE DISCLOSURE

Aspects of the present disclosure generally relate to wireless communication and to techniques and apparatuses for in-network processing for precoding or linear detection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first node (e.g., a base station, a radio unit, a distributed unit, or the like). The method may include transmitting, to a set of second nodes, a set of first values indicating a first estimated value at the first node and a first reliability value associated with the first estimated value, the set of first values being based at least in part on channel state information (CSI) associated with the first node and a set of UEs, wherein the first estimated value is associated with at least one of a linear detection value or a precoding value. The method may include receiving, from the set of second nodes, a set of second values indicating a second estimated value at the second node and a second reliability value associated with the second estimated value, the set of second values being based at least in part on respective CSI and respective received signals of the set of second nodes. The method may include transmitting, to the set of second nodes, a set of third values indicating a third estimated value at the first node and a third reliability value associated with the third estimated value, the set of third values being based at least in part on CSI associated with the first node and the set of UEs.

Some aspects described herein relate to a first node for wireless communication. The first node may include a memory and one or more processors coupled to the memory. The one or more processors may be configured to transmit, to a set of second nodes, a set of first values indicating a first estimated value at the first node and a first reliability value associated with the first estimated value, the set of first values being based at least in part on CSI associated with the first node and a set of UEs, wherein the first estimated value is associated with at least one of a linear detection value or a precoding value. The one or more processors may be configured to receive, from the set of second nodes, a set of second values indicating a second estimated value at the second node and a second reliability value associated with the second estimated value, the set of second values being based at least in part on respective CSI and respective received signals of the set of second nodes. The one or more processors may be configured to transmit, to the set of second nodes, a set of third values indicating a third estimated value at the first node and a third reliability value associated with the third estimated value, the set of third values being based at least in part on CSI associated with the first node and the set of UEs.

Some aspects described herein relate to a non-transitory computer-readable medium that stores a set of instructions for wireless communication by a first node. The set of instructions, when executed by one or more processors of the first node, may cause the first node to transmit, to a set of second nodes, a set of first values indicating a first estimated value at the first node and a first reliability value associated with the first estimated value, the set of first values being based at least in part on CSI associated with the first node and a set of UEs, wherein the first estimated value is associated with at least one of a linear detection value or a precoding value. The set of instructions, when executed by one or more processors of the first node, may cause the first node to receive, from the set of second nodes, a set of second values indicating a second estimated value at the second node and a second reliability value associated with the second estimated value, the set of second values being based at least in part on respective CSI and respective received signals of the set of second nodes. The set of instructions, when executed by one or more processors of the first node, may cause the first node to transmit, to the set of second nodes, a set of third values indicating a third estimated value at the first node and a third reliability value associated with the third estimated value, the set of third values being based at least in part on CSI associated with the first node and the set of UEs.

Some aspects described herein relate to an apparatus for wireless communication. The apparatus may include means for transmitting, to a set of nodes, a set of first values indicating a first estimated value at the first node and a first reliability value associated with the first estimated value, the set of first values being based at least in part on CSI associated with the apparatus and a set of UEs, wherein the first estimated value is associated with at least one of a linear detection value or a precoding value. The apparatus may include means for receiving, from the set of nodes, a set of second values indicating a second estimated value at the second node and a second reliability value associated with the second estimated value, the set of second values being based at least in part on respective CSI and respective received signals of the set of nodes. The apparatus may include means for transmitting, to the set of nodes, a set of third values indicating a third estimated value at the first node and a third reliability value associated with the third estimated value, the set of third values being based at least in part on CSI associated with the apparatus and the set of UEs.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
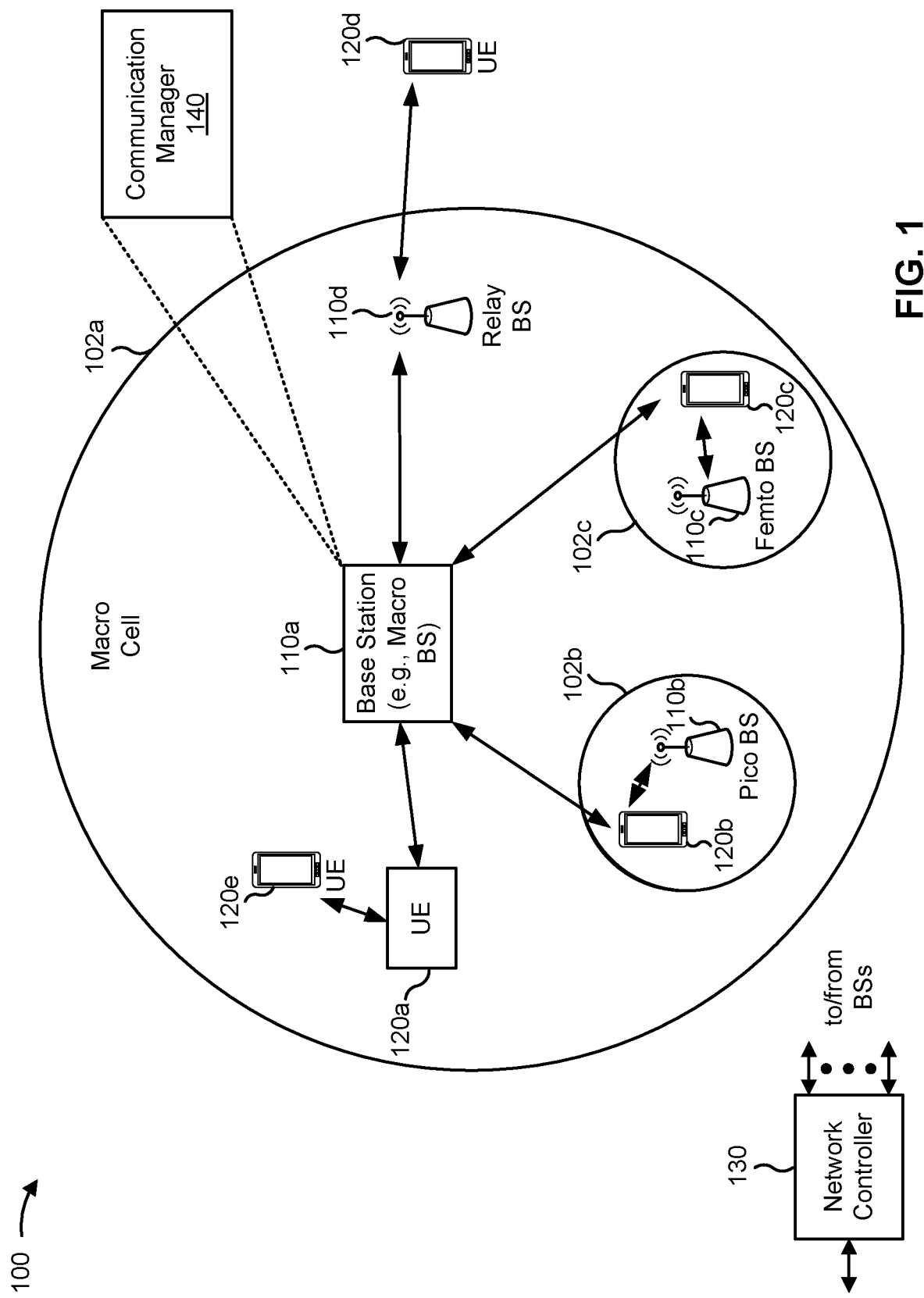
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium. In some examples, "UE" may refer to a radio unit of a disaggregated base station, a UE function of a base station, or the like.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a node (e.g., an antenna node, base station 110) may include a communication manager 140. As described in more detail elsewhere herein, the communication manager 140 may transmit, to a set of second nodes, a set of first values indicating a first estimated value at the first node and a first reliability value associated with the first estimated value, the set of first values being based at least in part on channel state information (CSI) associated with the first node and a set of UEs, wherein the first estimated value is associated with at least one of a linear detection value or a precoding value; receive, from the set of second nodes, a set of second values indicating a second estimated value at the second node and a second reliability value associated with the second estimated value, the set of second values being based at least in part on respective CSI and respective received signals of the set of second nodes; and transmit, to the set of second nodes, a set of third values indicating a third estimated value at the first node and a third reliability value associated with the third estimated value, the set of third values being based at least in part on CSI associated with the first node and the set of users. Additionally, or alternatively, the communication manager 140 may perform one or more other operations described herein.

As indicated above, FIG. 1 is provided as an example. Other examples may differ from what is described with regard to FIG. 1.

Figure 2:
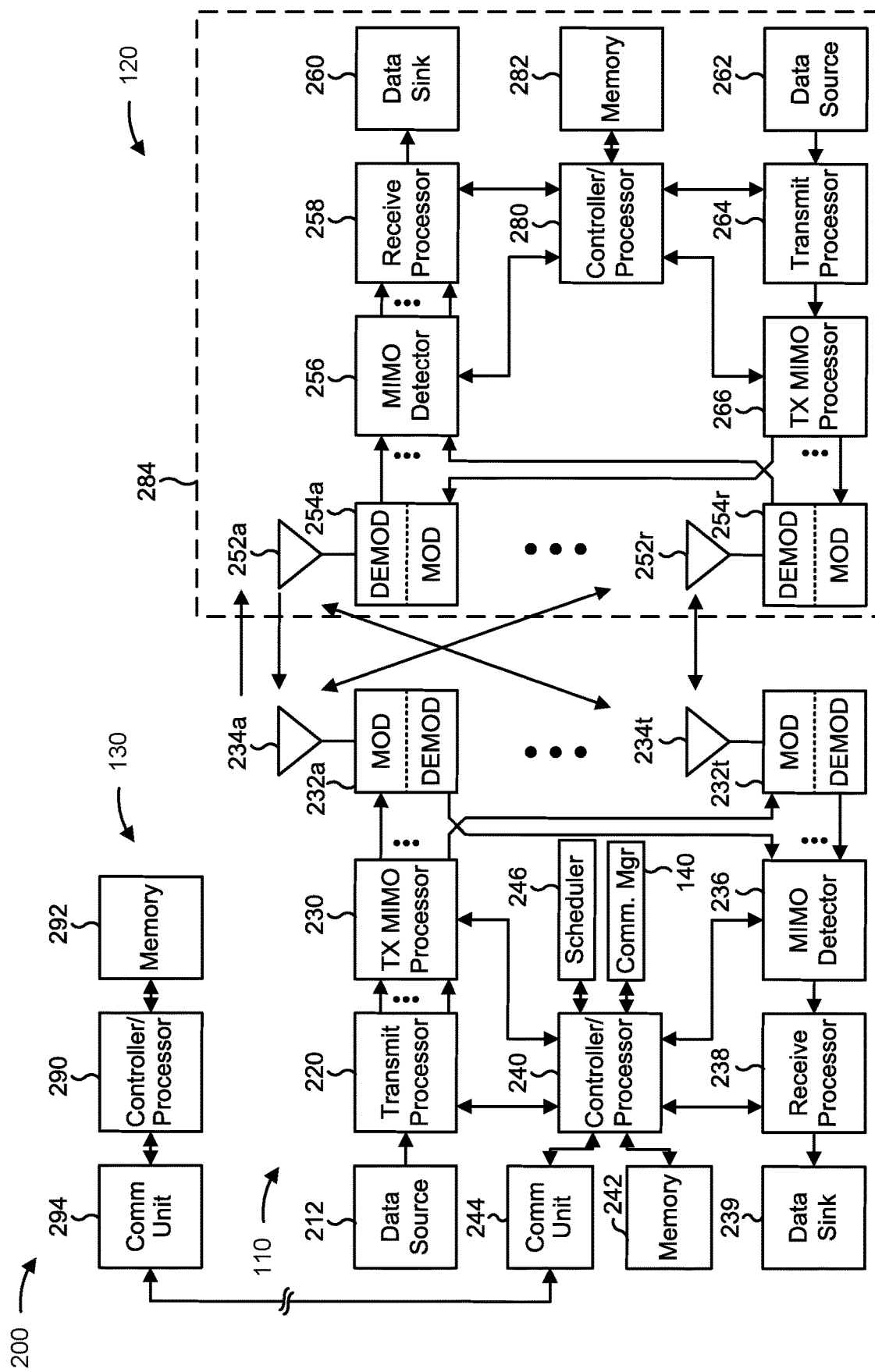
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-6).

The controller/processor 240 of the base station 110, the controller/processor 280 of the UE 120, and/or any other component(s) of FIG. 2 may perform one or more techniques associated with in-network precoding or linear detection, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
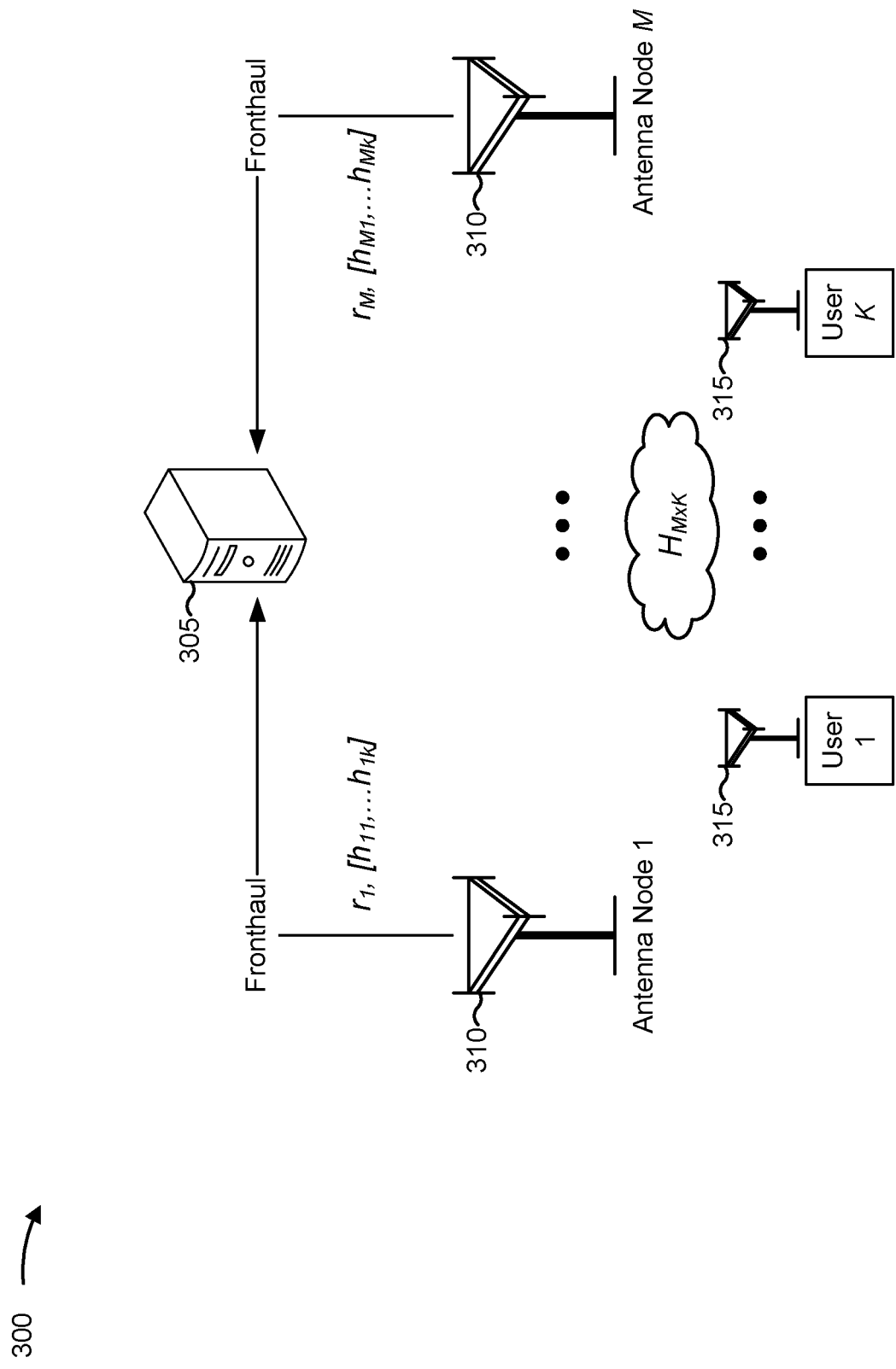
FIG. 3 is a diagram illustrating an example of distributed multiple-input multiple-output (MIMO), in accordance with the present disclosure.

FIG. 3 is a diagram illustrating an example 300 of distributed multiple-input multiple-output (MIMO), in accordance with the present disclosure. Example 300 includes a network node 305 (e.g., base station 110, a gNB, a central unit, or the like), a plurality of antenna nodes 310 (e.g., base station 110, a transmit-receive point (TRP), an access point, a radio head, a distributed unit, or the like), and a plurality of users 315 (e.g., UE 120, base station 110, or the like). In some examples, the network node 305 (e.g., via the plurality of antenna nodes 310) may receive a communication from the plurality of users 315. In some examples, the network node 305 (e.g., via the plurality of antenna nodes 310) may transmit a communication to the plurality of users 315.

MIMO provides for communication using multiple antennas at a transmitter and/or multiple antennas at a receiver. Distributed MIMO provides for constituting multiple-input multiple-output (MIMO) wireless communications systems through geographically separated antenna nodes 310 with either single or multiple antennas, thus improving the performance relative to a conventional MIMO system (in which all antennas at the transmitter, or all antennas at the receiver, are associated with the same node). In distributed MIMO, multiple antenna nodes 310 (shown as nodes 1 through M) associated with a network node 305 may communicate with users 315 (shown as users 1 through K). For reception, the antenna nodes 310 may collectively experience a channel $H_{M \times K}$ based at least in part on transmissions by users 315. The channel between an antenna node m and a user k may be expressed as $h_{mk}$. This notation (e.g., $h_{mk}$) is also used to indicate channel state information (CSI) that is determined based at least in part on the channel $h_{mk}$.

In distributed MIMO, each antenna node 310 may provide, to the network node 305 via a fronthaul link, CSI associated with each antenna node for all of the users 315 (which, for antenna node m and users 1 through K, may be represented as $[h_{m,1} \ldots h_{m,K}]$) and raw data (sometimes referred to as a sample or signal sample and represented by $r_m$) received at each antenna node 310. For example, each antenna node 310 may provide, to the network node 305, $(r_m, [h_{mi,1} \ldots H_{mi,K}])$. Since the raw data $r_m$ of each antenna node 310 is provided to the network node 305 for processing, this may be considered centralized processing. For example, the network node may perform linear detection (such as zero forcing, linear minimum mean square error (LMMSE), or the like) based at least in part on the CSI and the raw data to extract the respective signals transmitted by each of the K users. For transmission, precoding for antenna node m is performed in a similar fashion at the network node 305 based at least in part on the multiple users 1 through K and the CSI of the channel between the antenna node m and the users 1 through K.

Assuming flat fading (e.g., no inter-symbol interference), no additive white Gaussian noise (AWGN), a model using only real components (as opposed to a model incorporating complex or imaginary components), K users with a single transmit antenna each, and M antenna nodes with a single receive antenna (where M is at least K, and the ratio of K/M is represented herein by β), the raw data r collectively received via the channel H from the users 1 through K, taking into account noise n, can be represented in some examples as shown in Formulas 1 below:

$$r \triangleq [r_1, \ldots, r_M]^T = \begin{bmatrix} h_{11} & \ldots & h_{1K} \\ \vdots & \ddots & \vdots \\ h_{M1} & \ldots & h_{MK} \end{bmatrix} \begin{bmatrix} x_1 \\ \vdots \\ x_K \end{bmatrix} + n = Hx + n \qquad \text{Formulas 1}$$

Thus, the detection, using LMMSE, may use Formula 2 in some examples:

$$\hat{x} = (H^T H + \sigma^2 I_K)^{-1} H^T r \qquad \text{Formula 2}$$

In Formula 2, $\sigma^2$ represents the noise variance and $I_K$ represents a K×K identity matrix. $H^T H$ may be referred to herein as a cross-correlation matrix. A cross-correlation matrix can also be represented by R. T (in $H^T H$) represents a transpose operation. $\hat{x}$ may be a vector including K values, and may represent an estimate of symbols transmitted by the set of users 315.

Distributed MIMO involves significant processing load and complexity at the network node 305, since the network node 305 is processing received or transmitted signals (to perform precoding or linear detection) for each of the antenna nodes 310. Furthermore, distributed MIMO may involve significant traffic between the network node 305 and the antenna nodes 310 in order to convey r and H between the network node 305 and the antenna nodes 310. Still further, distributed MIMO may involve limited physical layer security, since received signal samples are provided via the fronthaul to the network node.

Some techniques and apparatuses described herein provide for distributed (e.g., in-network) processing of received or transmitted signals at the antenna nodes 1 through M (which may include access points, radio heads, distributed units, or the like). For example, in traditional distributed MIMO (as described with regard to example 300), processing of received or transmitted signals (e.g., linear detection of symbols of received samples, or precoding of data for transmission) is performed at the network node 305, which is separate from at least some of the antenna nodes 310 and which may be a cloud function. According to techniques and apparatuses described herein, processing, such as linear detection of received samples or precoding of data for transmission, is at least partially performed at the antenna nodes, such as based at least in part on the antenna nodes communicating with each other in accordance with an iterative algorithm. In this way, processing load at the network node is reduced, since linear detection and precoding may be handled at the antenna nodes. Furthermore, traffic between the network node and the antenna nodes is reduced since the antenna nodes may provide a detection result to the network node rather than a received signal sample. Still further, some aspects of the in-network processing may improve physical layer security, as described in more detail elsewhere herein.

As indicated above, FIG. 3 is provided as an example. Other examples may differ from what is described with regard to FIG. 3.

Figure 4:
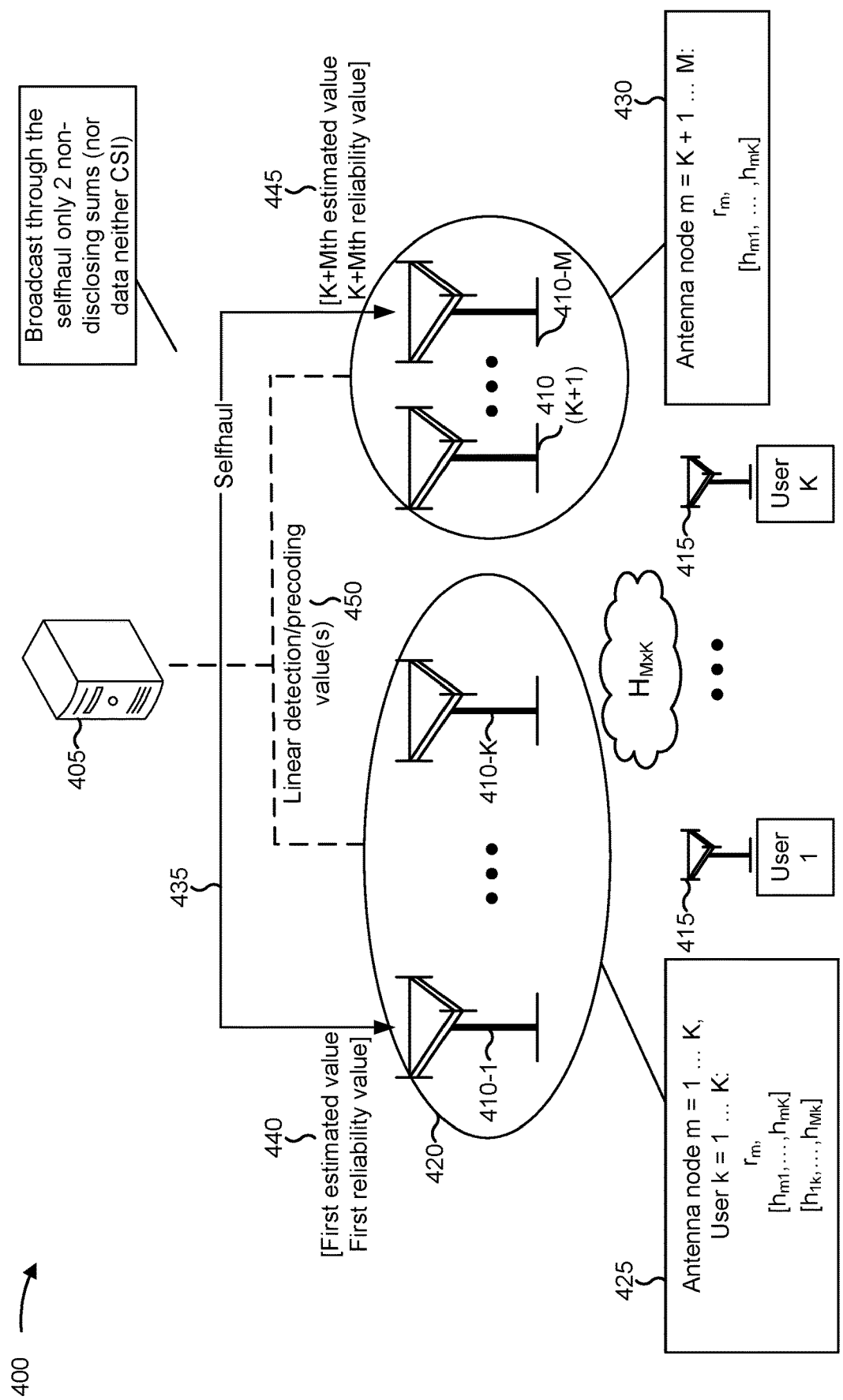
FIG. 4 is a diagram illustrating an example of in-network processing for distributed MIMO, in accordance with the present disclosure.

FIG. 4 is a diagram illustrating an example 400 of in-network processing for distributed MIMO, in accordance with the present disclosure. Example 400 includes a network node 405 (e.g., base station 110, a gNB, a central unit, or the like), a plurality of antenna nodes 410-1 through 410-M (e.g., base station 110, a TRP, an access point, a radio head, a distributed unit, a radio unit, or the like), and a plurality of users 415 (e.g., UE 120, base station 110, or the like). In some examples, the network node 405 (e.g., via the plurality of antenna nodes 410) may receive a communication from the plurality of users 415. In some examples, the network node 405 (e.g., via the plurality of antenna nodes 410) may transmit a communication to the plurality of users 415. In example 400, as in example 300, there are M antenna nodes 410 and K users 415. In some aspects, an antenna node 410 is referred to herein as a node, such as a first node or a second node.

Example 400 illustrates a first mode (referred to herein as minimal knowledge mode, or H-mode). In the first mode, each antenna node 410 may be aware of CSI associated with that antenna node 410 and the K users 415. For example, antenna node m may determine $[h_{m1} \ldots h_{mK}]$. Furthermore, a subset of antenna nodes 410, shown by reference number 420 and including K antenna nodes (corresponding to K users 415), may be aware of (e.g., have access to information indicating) CSI associated with each of the M antenna nodes 410 and a particular user 415. For example, each antenna node, of the subset of antenna nodes 410, may be associated with one of the users 415. As shown by reference number 425, an antenna node m, associated with a user k, may determine or receive CSI $[h_{1k} \ldots h_{Mk}]$ (e.g., CSI associated with each antenna node 1 through M and the user k). An antenna node that is associated with a user k may be referred to as a proxy for user k.

In some aspects, an antenna node 410 may receive the CSI $[h_{1k} \ldots h_{Mk}]$ from a user 415. For example, a user k may determine the CSI $[h_{1k} \ldots h_{Mk}]$ for each antenna node 410 and may transmit the CSI $[h_{1k} \ldots h_{Mk}]$ associated with the user k. An antenna node 410 may receive the CSI locally (e.g., via single-user detection). In some aspects, an antenna node 410 associated with the user k may be selected based at least in part on a signal-to-noise ratio (SNR) of the transmission of the CSI, a proximity of the antenna node to the user k, or another factor. This may be applicable, for example, for time division duplexing (TDD) based antenna nodes. In some aspects, the antenna nodes 1 through K may share the CSI among one another. For example, antenna node 1 may provide, to a proxy of user k, $h_{1k}$. Antenna node 2 may provide, to the proxy of user k, $h_{2k}$, and so on.

As mentioned above, the antenna nodes 410 may be associated with selfhaul connections with one another. As used herein, a selfhaul connection is a connection between two antenna nodes 410. In some aspects, a selfhaul connection may not route communications via a network node. For example, a selfhaul may be a direct link between two antenna nodes 410. By using the selfhaul connections for communication of CSI, scalar values (described elsewhere herein), and/or signal samples (described elsewhere herein), traffic volume, and signaling overhead at the network node 405 may be reduced.

As further shown, the antenna nodes 410 may include antenna nodes K+1 through M. Antenna nodes K+1 through M may not function as proxies for users 415. Thus, as shown by reference number 430, an antenna node m, of antenna nodes K+1 through M, may determine or have access to CSI regarding only $[h_{m1} \ldots h_{mK}]$ (that is, CSI associated with the antenna node m and the set of users 415). For example, the antenna node m may determine CSI for each UE 1 through K. In this way, processing and signaling resources are conserved that would otherwise be used to determine CSI for the entire channel H and/or a full cross-correlation matrix at each of the antenna nodes 410 and/or at the network node 405.

In some aspects, the antenna nodes 410 may perform detection or precoding in a second mode (referred to herein as a "more knowledge" mode, or R-mode). In the second mode, each of the K antenna nodes 410 (shown by reference number 420) may have access to a CSI matrix. For example, each of the K antenna nodes 410 may communicate at least part of the CSI matrix for $H_{M \times K}$ with each other via one or more selfhaul connections such that each of the K antenna nodes has access to the CSI matrix for $H_{M \times K}$. For example, an antenna node k may communicate CSI $[h_{1k} \ldots h_{Mk}]$ to other antenna nodes of the K antenna nodes 410, and may receive corresponding CSI from one or more of the other K antenna nodes 410 such that CSI matrix for $H_{M \times K}$ can be constructed at the antenna node k. In some aspects, each of the K antenna nodes 410 may communicate received signal samples (e.g., $r_m$) with one another, such as in association with the CSI matrix or separately from the CSI matrix. Since each of the K antenna nodes 410 has access to the CSI matrix, each of the K antenna nodes 410 can determine the kth row of the cross-correlation matrix $R = H^T H$. Thus, each of the K antenna nodes 410 can function as a proxy for one of the K users 415.

As further shown by reference numbers 425 and 430, an antenna node m, of the antenna nodes 410, may determine raw data $r_m$ associated with that antenna node m. For example, the antenna node m may receive a signal from the users 415, and may determine a signal sample based at least in part on the received signal. In some aspects, each antenna node of the antenna nodes 410 may determine a respective signal sample r.

The antenna nodes 410 may use an iterative procedure for detection of signals received from the users 415, as described in more detail in connection with FIG. 5. As mentioned above, detection (e.g., linear detection, such as LMMSE) may determine a vector (x) representing an estimation of symbol(s) transmitted by the set of users 415 based at least in part on raw data (r) and CSI (H) using Formula 2, reproduced here for clarity:

$$\hat{x} = (H^T H + \sigma^2 I_K)^{-1} H^T r$$

The determination of the vector x may be equivalent to solving a linear system including a CSI matrix A, a received vector b, a vector x*, and a nuisance vector z. For example, the determination of the vector x may be equivalent to solving Linear System 3, shown below:

$$\underbrace{\begin{bmatrix} I_K & H^T \\ H & -\sigma^2 I_M \end{bmatrix}}_{A} \underbrace{\begin{bmatrix} \hat{x} \\ z \end{bmatrix}}_{x^*} = \underbrace{\begin{bmatrix} 0 \\ r \end{bmatrix}}_{b} \qquad \text{Linear System 3}$$

In Linear System 3, the nuisance vector z may be defined as $z = -(H^T)^{-1} \hat{x}$.

In the first mode, an antenna node m may know (e.g., have access to information indicating) the (K+m)th row of the CSI matrix A (that is, the mth row of H) and the (K+m)th entry value of the received vector b. As mentioned above, if the antenna node m serves as a proxy for a kth UE, the antenna node m may also know the kth row of the CSI matrix A (that is, the kth row of $H^T$).

As shown by reference number 435, the antenna nodes 1 through M may exchange sets of values in association with the iterative procedure. The iterative procedure may be based at least in part on an index i. At antenna node m, the index may be set as K+m. If the antenna node acts as a proxy for a UE k, the antenna node may also perform the iterative procedure with i set to k (so operations of the iterative procedure may be performed once with i=k and once with i=K+m). For example, a first antenna node 410 may determine a set of first values, shown by reference number 440. The set of first values may include a first estimated value at the first antenna node 410 (represented herein by $\hat{\mu}_i$, and representing an estimation of the transmitted symbol) and a first reliability value associated with the estimated value (represented herein by $\tilde{P}_i$). The estimated value at the first antenna node 410 may be based at least in part on the received vector b and the CSI matrix A. The reliability value may be based at least in part on the CSI matrix A. The first antenna node 410 may transmit the set of first values to a second antenna node 410 (in this example, the (K+m)th antenna node 410, m=1, . . . , M−K), such as via a selfhaul connection with the second antenna node 410. The second antenna node 410 may determine a set of second values, shown by reference number 445. The set of second values may include an estimated value at the second antenna node 410 and a reliability value associated with the estimated value at the second antenna node 410. In some aspects, the set of second values may be based at least in part on the set of first values (e.g., when using series processing), as described below. In some other aspects, the set of second values may be independent of the set of first values (e.g., when using parallel processing), as also described below. The first antenna node 410 may determine a set of third values based at least in part on the set of first values and/or the set of second values. For example, the first antenna node 410 may perform an iteration of the iterative procedure to determine the set of third values based at least in part on a difference between the set of first values and the set of second values. In some aspects, the set of first values may be based at least in part on a previously received set of values, such as from the second antenna node 410 or another antenna node 410. In some aspects, the antenna nodes 410 may broadcast the sets of values (e.g., the estimated values and the reliability values) to one another, such as via the selfhaul connections.

Figure 5:
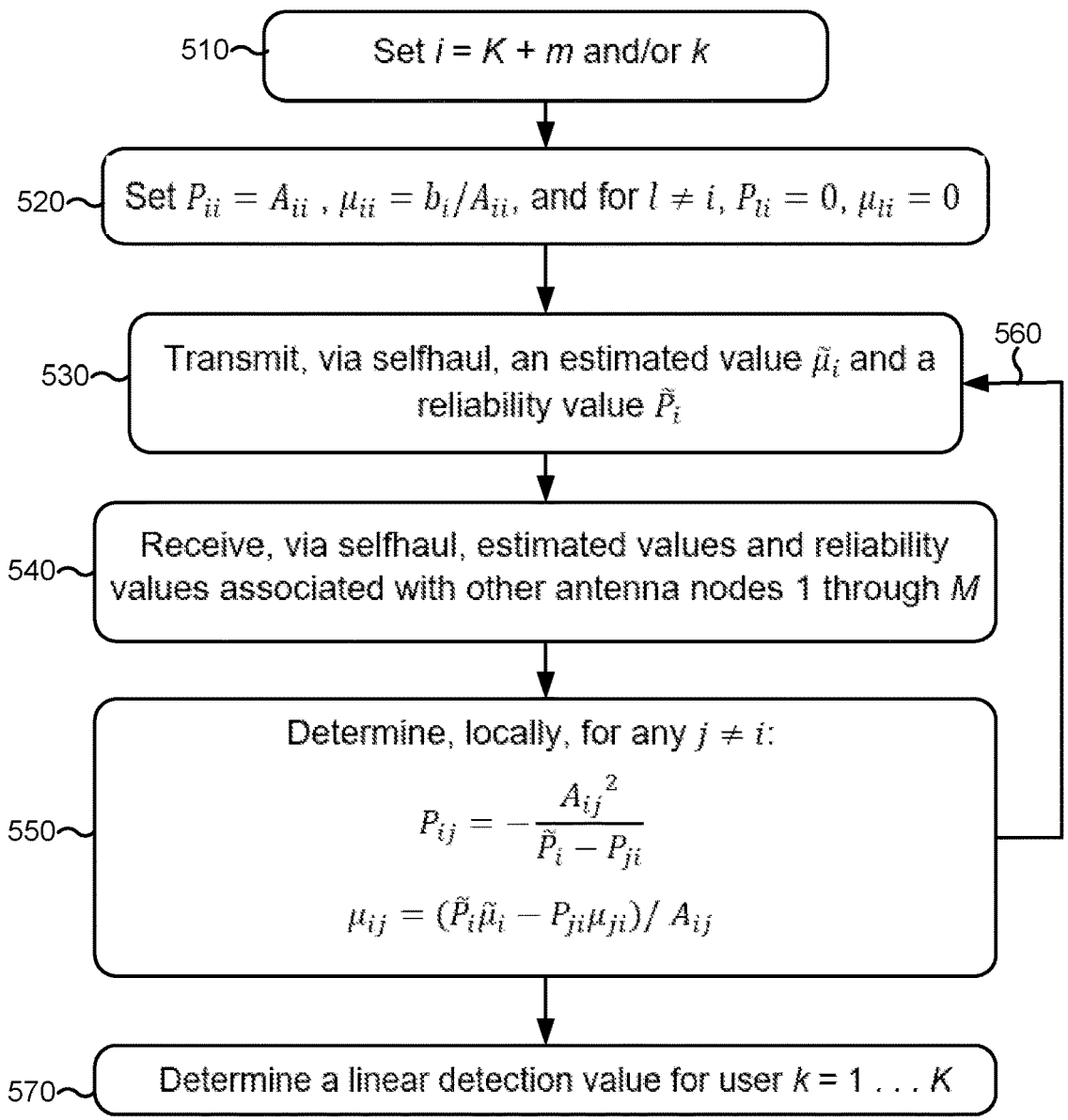
FIG. 5 is a diagram illustrating an example iterative procedure for detection or precoding, in accordance with the present disclosure.

An example iterative procedure 500 for detection is shown in FIG. 5. The iterative procedure may be performed by an antenna node m (with i set to k+m). If the antenna node m is a proxy for a user k, the antenna node m may also perform the below operations for the user k (with i set to k):

In step 510, the antenna node m may set i=K+m and/or k. For example, the antenna node m may perform the procedure 500 using i=k+m whether or not the antenna node m is a proxy, and may also perform the procedure 500 using i=k if the antenna node is a proxy for user(s) k. An antenna node can be a proxy for multiple users.

In step 520, the antenna node m may set $P_{ii}=A_{ii}$, $\mu_{ii}=b_i/A_{ii}$, and for l≠i, $P_{li}=0$, $\mu_{li}=0$. At this point, the antenna node m has set initial values of the ith diagonal of the estimated value vector μ and the reliability value vector P. In this step, $P_{li}$ and $\mu_{li}$ may be initialized to zero, since the antenna node m may not yet have information regarding b at other antenna nodes (and in some examples may not have information regarding rows of A pertaining to other antenna nodes). When performing precoding, b may be derived from a set of symbols to be transmitted by the antenna node m. When performing linear estimation, b may be derived from a signal received by the antenna node m.

In step 530, the antenna node m may transmit, via the selfhaul, an estimated value $\tilde{\mu}_i$ and a reliability value $\tilde{P}_i$:

$$\tilde{P}_i = P_{ii} = \sum_{l \neq i} P_{li}$$

$$\tilde{\mu}_i = \tilde{P}_i^{-1}\left(P_{ii}\mu_{ii} + \sum_{l \neq i} P_{li}\mu_{li}\right)$$

Thus, the antenna node m may provide information regarding A and b, relating to the antenna node m, to other antenna nodes 1 through M. In this example, $P_{ii}$ represents the ith diagonal entry of the matrix P. l and j denote indices along the rows and columns of the matrices.

In step 540, the antenna node m may receive, via the selfhaul, estimated values and reliability values associated with other antenna nodes 1 through M:

$$\sum_{l \neq i} \tilde{P}_l$$

$$\sum_{l \neq i} \tilde{\mu}_l$$

Thus, the antenna node m may attain information derived from A and b as observed at the other antenna nodes. This information can be used to update the antenna node m's estimation or determination of x.

In step 550, the antenna node m may determine, locally, for any j≠i:

$$P_{ij} = -\frac{A_{ij}^2}{\tilde{P}_i - P_{ji}}$$

$$\mu_{ij} = (\tilde{P}_i\tilde{\mu}_i - P_{ji}\mu_{ji})/A_{ij}$$

For example, the antenna node m may perform this determination using at least part of the estimated values and reliability values received in step 540.

In step 560, the antenna node m may repeat the steps 530, 540, and 550 until convergence of $P_{ij}$ and $\mu_{ij}$ satisfies a convergence criterion. In some aspects, the convergence criterion may be based at least in part on μ. For example, if $\mu_{ij}$ at a current iteration minus $\mu_{ij}$ at a previous iteration satisfies a threshold (e.g., if the absolute value of $\mu_{ij}$ at a current iteration minus $\mu_{ij}$ at a previous iteration is lower than the threshold), then the convergence criterion may be satisfied. As another example, the convergence criterion may be a fixed number of iterations of the above operation. Other convergence criteria can additionally or alternatively be used. Once the convergence criterion is satisfied, the antenna node m may proceed to step 570.

In step 570, the antenna node m may determine a linear detection value (e.g., a linear estimation) or a precoding value for user k=1 . . . K:

$$\hat{x}_k = \left(P_{kk}\mu_{kk} + \sum_{l \neq k}P_{lk}\mu_{lk}\right) / \left(P_{kk} + \sum_{l \neq k}P_{lk}\right)$$

For example, a set of antenna nodes 410 may determine a linear detection value or a precoding value for respective users 415, and the linear detection values or the precoding values may include a linear detection value or a precoding value (e.g., an estimated value of the vector x) for each user of the K users 415. Similar operations may be performed for precoding, and at the step 570, a precoding value may be determined associated with user k. For example, a set of antenna nodes 410 may determine a precoding value for respective users 415, and the precoding values may include a precoding value (e.g., a determined value of the vector x) for each user of the K users 415. In some aspects, the set of antenna nodes 410 may include K antenna nodes 410, and each antenna node k may determine a precoding value or a linear detection value associated with a user k.

In the second mode, the determination of the vector x may be equivalent to solving a linear system including a CSI matrix A, a received vector b, and a vector x*. For example, the determination of the vector x may be equivalent to solving Linear System 4, shown below:

$$\underbrace{(R + \sigma^2 I_K)}_{A} \underbrace{\hat{x}}_{x^*} = \underbrace{H^T r}_{b} \qquad \text{Linear System 4}$$

In the second mode, as mentioned above, an antenna node m, selected from antenna nodes 1 through K, may have access to information indicating the kth row of $R=H^T H$. The antenna node m may use the example iterative procedure shown above to determine the first value and the second value, and may thereby converge on a linear detection value or a precoding value. Thus, the antenna nodes 410 may determine linear detection values (e.g., linear estimations) or precoding values for the set of users 415 in a distributed manner.

In some aspects, a first antenna node 410 and a second antenna node 410 may perform the iterative algorithm in parallel. For example, the first antenna node 410 may determine a set of first values (at step 530), and the second antenna node 410 may determine a set of second values (at step 530) without reference to the set of first values (e.g., at the same time as the determination of the set of first values, prior to the determination of the set of first values, without having received the set of first values at step 540, or the like). In some other aspects, a first antenna node 410 and a second antenna node 410 may perform the iterative algorithm in series. For example, the first antenna node 410 and the second antenna node 410 may perform the iterative algorithm in accordance with a sequence. The sequence may indicate an order in which antenna nodes 410 are to determine and transmit sets of values. For example, the sequence may indicate that the first antenna node 410 is to determine and transmit a set of first values (at step 530), then the second antenna node 410 is to determine and transmit a set of second values (at step 530) based at least in part on the set of first values (as received at step 540, such that the second antenna node 410 performs the step 540 before the step 530), and so on. Performing the iterative algorithm in series may converge in fewer iterations than performing the iterative algorithm in parallel. However, performing the iterative algorithm in parallel may support a higher load (i.e., a larger value of K/M).

In the second mode, when performing the iterative algorithm in series, the iterative procedure may converge based at least in part on a spectral radius ρ (which may be expressed as a maximal eigenvalue in absolute value) and a diagonal matrix D corresponding to the matrix A. For example, the iterative procedure may converge as:

$$\rho\left(I_K - \left|D^{-\frac{1}{2}} A D^{-\frac{1}{2}}\right|\right) = \rho\left(I_K - \left|D^{-\frac{1}{2}}(R+\sigma^2 I_K) D^{-\frac{1}{2}}\right|\right) < 1;$$

$$D \triangleq \text{diag}(A)$$

In the second mode, when performed in series, the iterative procedure may converge for a wider range of loads and SNRs than when the iterative procedure is performed in parallel (e.g., based at least in part on the spectral radii being known). For example, the spectral radius may be defined as $$\rho\left(I_K - \left|D^{-\frac{1}{2}} A D^{-\frac{1}{2}}\right|\right) < 1.$$

Assuming a large Rayleigh fading channel, $\rho(H^T H)=(1+\sqrt{\beta})^2$ and $D=(1+\sigma^2)I_K$. Thus, $$\rho\left(I_K - \left|D^{-\frac{1}{2}} A D^{-\frac{1}{2}}\right|\right) > \rho\left(I_K - D^{-\frac{1}{2}} A D^{-\frac{1}{2}}\right) =$$

$$\rho\left(D^{-\frac{1}{2}} A D^{-\frac{1}{2}} - I_K\right) = \rho\left(\frac{1}{(1+\sigma^2)} H^T H - \left(1 - \frac{\sigma^2}{1+\sigma^2}\right)I_K\right) =$$

$$\frac{1}{(1+\sigma^2)}(1+\sqrt{\beta})^2 = \left(1 - \frac{\sigma^2}{1+\sigma^2}\right) < 1.$$

In this example, the maximum load in which the iterative procedure will converge can be derived from the above as $$\beta < \left(\sqrt{\frac{2SNR+1}{SNR}} - 1\right)^2.$$

In the worst case (that is, infinite SNR), the maximal load may be $\beta < (\sqrt{2}-1)^2 \approx 0.17$. In some examples, $\sigma^2$ may represent K/SNR.

In the first mode, for large systems, the iterative procedure may converge at any load β and any SNR for Gaussian signaling. In some aspects, the iterative procedure may converge at any load β and any SNR for non-Gaussian signaling. As used herein, a large system may represent a limit assumption, such as an assumption that there are an infinite number of UEs and an infinite number of antenna nodes.

In some aspects, an antenna node 410 may perform an iteration including multiple loops. For example, the antenna node 410 may perform two iterations of step 530 to determine a set of values before transmitting the set of values. In one example, the antenna node 410 may use a factory (which in some aspects may be a predefined scalar) for the two iterations: $(A+\beta I_K)x^* = b + \gamma x^* = \tilde{b}$. Using the factor γ may decrease spectral radius, and may allow the convergence of the inner loop of the iterative procedure at steps 530, 540, and 550.

Returning to FIG. 4, in some aspects, the antenna nodes 410 may provide the determined linear detection values to the network node 405, as shown by reference number 450. In such examples, the network node 405 may perform further processing of the determined linear detection values. In some aspects, the antenna nodes 410 may transmit a communication using a precoding value determined using the iterative algorithm described above.

The determination of the linear detection values and/or the precoding values at the antenna nodes 410 may reduce complexity of determination of the linear detection values and/or precoding values. For example, in traditional distributed MIMO (as described in connection with FIG. 3), the network node 305's determination of the linear detection values and/or precoding values may have a complexity of $O(K^3)+O(K^2 M)+O(KM)$. The techniques described herein may have a lower complexity. For example, in the first mode, the determination of the linear detection values may have an overall complexity (across all antenna nodes 410) of $O(K^2)+O(KM)$. At a given antenna node 410, the complexity may be $O(K+M)$. In the second mode, the determination of the linear detection values and/or precoding values may have an overall complexity of $O(K^2)+O(KM)$. At a given antenna node 410, the complexity may be $O(K+M)$. Thus, the complexity of linear detection and precoding is reduced from overall cubic complexity to overall quadratic complexity, and complexity at a given antenna node 410 is linear.

In this way, the techniques described herein provide in-network (e.g., at antenna nodes 410) determination of linear detection values and/or precoding values. Thus, traffic on the fronthaul to the network node 405 is reduced, processing resource usage at the network node 405 is reduced, and in some aspects traffic between the antenna nodes 410 may be reduced (relative to providing the entire cross-correlation matrix to each antenna node 410). Still further, the first mode may provide increased security (e.g., secrecy) relative to traditional distributed MIMO, since signal samples are not provided between antenna nodes 410 or to the network node 405 in the first mode.

As indicated above, FIGS. 4 and 5 are provided as examples. Other examples may differ from what is described with regard to FIGS. 4 and 5.

Many of the examples described with regard to FIGS. 3-5 are described with certain assumptions, such as a model using real components, a single transmit antenna per user, a single receive antenna per antenna node, flat fading, and flat AWGN. However, the techniques described herein can readily be applied in the absence of such assumptions, such as using a model that incorporates imaginary components, multiple transmit antennas for a user, multiple receive antennas per antenna node, non-flat fading, non-flat AWGN, or a combination thereof.

Some techniques of examples 300, 400, and 500 are described with regard to determination of linear detection values. These techniques can readily be applied for determination of precoding values, such as for transmission of communications by the antenna nodes 410. Furthermore, while examples 300, 400, and 500 are sometimes described with regard to LMMSE, the techniques of examples 300, 400, and 500 can be applied for other forms of detection, such as zero-forcing (ZF) or the like.

Figure 6:
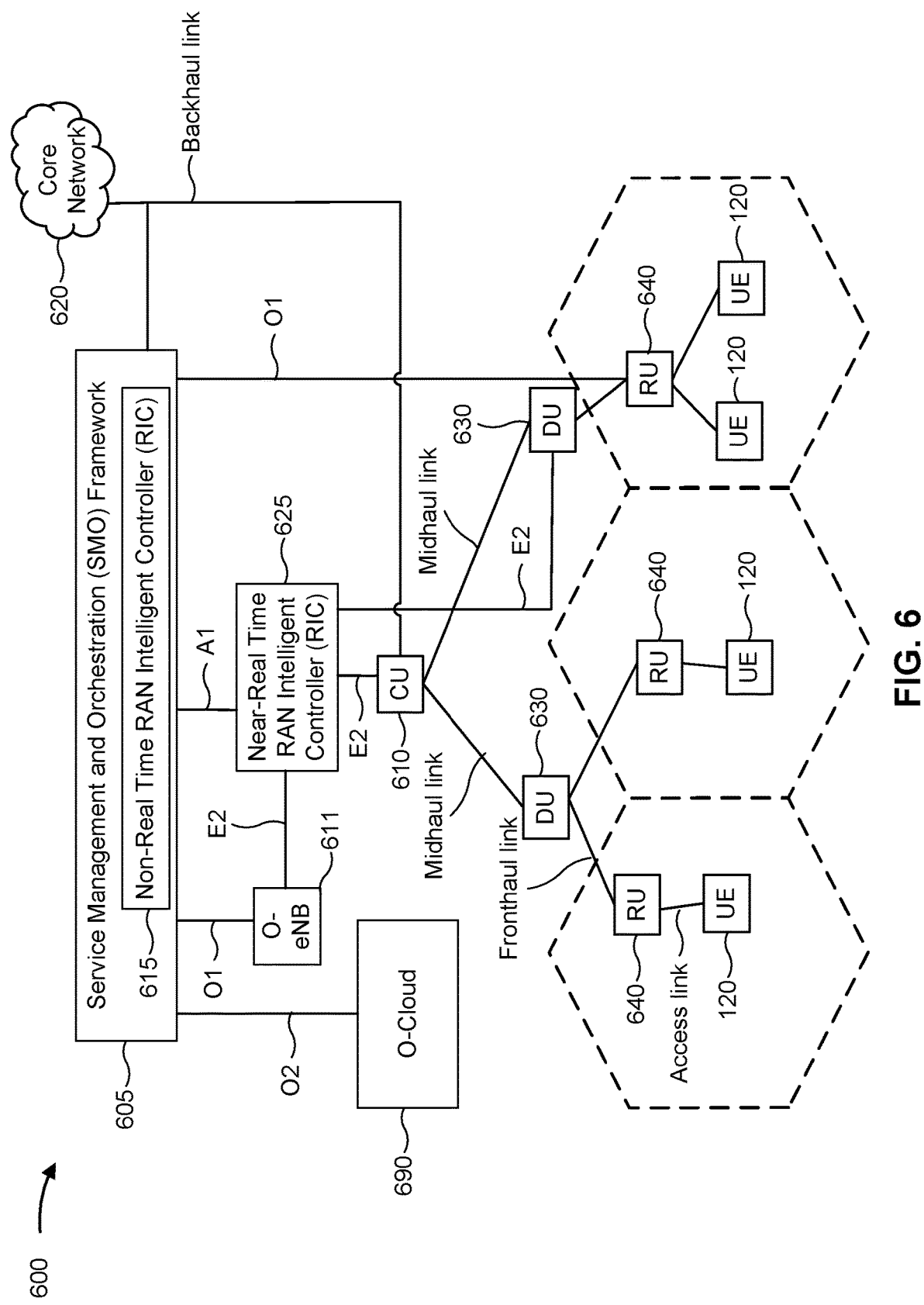
FIG. 6 is a diagram illustrating an example disaggregated base station architecture, in accordance with the present disclosure.

FIG. 6 is a diagram illustrating an example 600 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 6 may include one or more CUs 610 that can communicate directly with a core network 620 via a backhaul link, or indirectly with the core network 620 through one or more disaggregated base station units (such as a Near-Real Time (Near-RT) RAN Intelligent Controller (MC) 625 via an E2 link, or a Non-Real Time (Non-RT) RIC 615 associated with a Service Management and Orchestration (SMO) Framework 605, or both). A CU 610 may communicate with one or more DUs 630 via respective midhaul links, such as an F1 interface. The DUs 630 may communicate with one or more RUs 640 via respective fronthaul links. The RUs 640 may communicate with respective UEs 120 via one or more radio frequency (RF) access links. In some implementations, the UE 120 may be simultaneously served by multiple RUs 640.

Each of the units (e.g., the CUs 610, the DUs 630, the RUs 640), as well as the Near-RT RICs 625, the Non-RT RICs 615, and the SMO Framework 605, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 610 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 610. The CU 610 may be configured to handle user plane functionality (e.g., Central Unit-User Plane (CU-UP)), control plane functionality (e.g., Central Unit-Control Plane (CU-CP)), or a combination thereof. In some implementations, the CU 610 can be logically split into one or more CU-UP units and one or more CU-CP units. The CU-UP unit can communicate bidirectionally with the CU-CP unit via an interface, such as the E1 interface when implemented in an O-RAN configuration. The CU 610 can be implemented to communicate with the DU 630, as necessary, for network control and signaling.

The DU 630 may correspond to a logical unit that includes one or more base station functions to control the operation of one or more RUs 640. In some aspects, the DU 630 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 6rd Generation Partnership Project (3GPP). In some aspects, the DU 630 may further host one or more low-PHY layers. Each layer (or module) can be implemented with an interface configured to communicate signals with other layers (and modules) hosted by the DU 630, or with the control functions hosted by the CU 610.

Lower-layer functionality can be implemented by one or more RUs 640. In some deployments, an RU 640, controlled by a DU 630, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 640 can be implemented to handle over the air (OTA) communication with one or more UEs 120. In some implementations, real-time and non-real-time aspects of control and user plane communication with the RU(s) 640 can be controlled by the corresponding DU 630. In some scenarios, this configuration can enable the DU(s) 630 and the CU 610 to be implemented in a cloud-based RAN architecture, such as a vRAN architecture.

The SMO Framework 605 may be configured to support RAN deployment and provisioning of non-virtualized and virtualized network elements. For non-virtualized network elements, the SMO Framework 605 may be configured to support the deployment of dedicated physical resources for RAN coverage requirements which may be managed via an operations and maintenance interface (such as an O1 interface). For virtualized network elements, the SMO Framework 605 may be configured to interact with a cloud computing platform (such as an open cloud (O-Cloud) 690) to perform network element life cycle management (such as to instantiate virtualized network elements) via a cloud computing platform interface (such as an O2 interface). Such virtualized network elements can include, but are not limited to, CUs 610, DUs 630, RUs 640 and Near-RT RICs 625. In some implementations, the SMO Framework 605 can communicate with a hardware aspect of a 4G RAN, such as an open eNB (O-eNB) 611, via an O1 interface. Additionally, in some implementations, the SMO Framework 605 can communicate directly with one or more RUs 640 via an O1 interface. The SMO Framework 605 also may include a Non-RT RIC 615 configured to support functionality of the SMO Framework 605.

The Non-RT RIC 615 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 625. The Non-RT RIC 615 may be coupled to or communicate with (such as via an A1 interface) the Near-RT RIC 625. The Near-RT RIC 625 may be configured to include a logical function that enables near-real-time control and optimization of RAN elements and resources via data collection and actions over an interface (such as via an E2 interface) connecting one or more CUs 610, one or more DUs 630, or both, as well as an O-eNB, with the Near-RT RIC 625.

In some implementations, to generate AI/ML models to be deployed in the Near-RT RIC 625, the Non-RT RIC 615 may receive parameters or external enrichment information from external servers. Such information may be utilized by the Near-RT RIC 625 and may be received at the SMO Framework 605 or the Non-RT RIC 615 from non-network data sources or from network functions. In some examples, the Non-RT RIC 615 or the Near-RT RIC 625 may be configured to tune RAN behavior or performance. For example, the Non-RT RIC 615 may monitor long-term trends and patterns for performance and employ AI/ML models to perform corrective actions through the SMO Framework 605 (such as reconfiguration via O1) or via creation of RAN management policies (such as A1 policies).

As indicated above, FIG. 6 is provided as an example. Other examples may differ from what is described with regard to FIG. 6.

Figure 7:
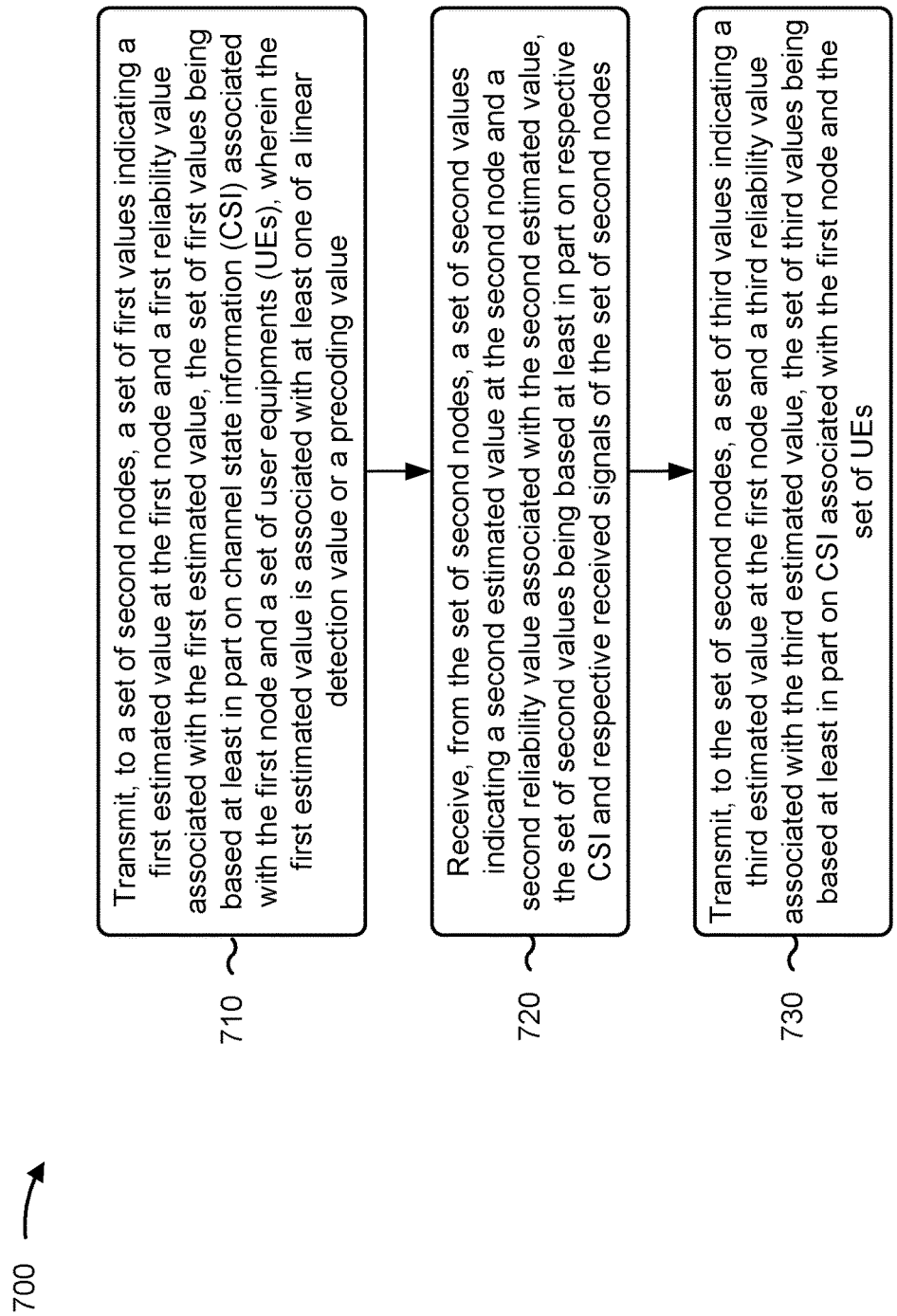
FIG. 7 is a diagram illustrating an example process performed by an antenna node, in accordance with the present disclosure.

FIG. 7 is a diagram illustrating an example process 700 performed, for example, by a first node, in accordance with the present disclosure. Example process 700 is an example where the first node (e.g., base station 110, UE 120, antenna node 310, antenna node 410, a DU, an RU) performs operations associated with in-network distributed processing for precoding and linear detection.

As shown in FIG. 7, in some aspects, process 700 may include transmitting, to a set of second nodes, a set of first values indicating a first estimated value at the first node and a first reliability value associated with the first estimated value, the set of first values being based at least in part on CSI associated with the first node and a set of UEs, wherein the first estimated value is associated with at least one of a linear detection value or a precoding value (block 710). For example, the first node (e.g., using communication manager 140 and/or transmission component 804, depicted in FIG. 8) may transmit, to a set of second nodes (e.g., base station 110, UE 120, antenna node 310, antenna node 410), a set of first values indicating a first estimated value ($\hat{\mu}_i$) at the first node and a first reliability value ($\tilde{P}_i$) associated with the first estimated value, the set of first values being based at least in part on CSI associated with the first node and a set of UEs (e.g., UE 120, user 315, user 415), wherein the first estimated value is associated with at least one of a linear detection value or a precoding value, as described above. The linear detection value or the precoding value may be represented by $\hat{x}_k$, as described above. The first node may be an antenna node of a plurality of antenna nodes (e.g., antenna nodes 310 or 410), and the set of second nodes may be one or more antenna nodes of the plurality of antenna nodes (e.g., antenna nodes 310 or 410). The set of first values may be determined and transmitted at step 530 of FIG. 5.

As further shown in FIG. 7, in some aspects, process 700 may include receiving, from the set of second nodes, a set of second values indicating a second estimated value ($\mu_{ji}$ or $\hat{\mu}_l$) at the second node and a second reliability value ($P_{ji}$ or $\tilde{P}_l$) associated with the second estimated value, the set of second values being based at least in part on respective CSI and respective received signals of the set of second nodes (block 720). For example, the first node (e.g., using communication manager 140 and/or reception component 802, depicted in FIG. 8) may receive, from the set of second nodes, a set of second values indicating a second estimated value at the second node and a second reliability value associated with the second estimated value. The set of second values may be based at least in part on respective CSI and respective received signals of the set of second nodes, as described above. The set of second values may be determined and transmitted by the second node at step 530 of FIG. 5, and received by the first node at step 540 of FIG. 5.

As further shown in FIG. 7, in some aspects, process 700 may include transmitting, to the set of second nodes, a set of third values indicating a third estimated value at the first node and a third reliability value associated with the third estimated value, the set of third values being based at least in part on CSI associated with the node and the set of UEs (block 730). For example, the first node (e.g., using communication manager 140 and/or transmission component 804, depicted in FIG. 8) may transmit, to the set of second nodes, a set of third values indicating a third estimated value ($\tilde{\mu}_i$) at the first node and a third reliability value ($\tilde{P}_i$) associated with the third estimated value. The set of third values may be based at least in part on CSI associated with the node and the set of UEs, as described above. For example, the set of third values may be based at least in part on at least one of the set of first values, the set of second values, and/or CSI for the channel between the node and one or more UEs of the set of UEs. The set of third values may be determined after the set of first values.

In this way, processing load at the network node is reduced, since linear detection and precoding may be handled at the antenna nodes. Furthermore, traffic between the network node and the antenna nodes is reduced since the antenna nodes may provide a detection result to the network node rather than a received signal sample.

Process 700 may include additional aspects, such as any single aspect or any combination of aspects described below and/or in connection with one or more other processes described elsewhere herein.

With respect to process 700, in a first aspect, process 700 includes determining the linear detection value based at least in part on the set of third values and based at least in part on the set of second values and the set of third values satisfying a convergence criterion, and providing the linear detection value.

With respect to process 700, in a second aspect, alone or in combination with the first aspect, process 700 includes determining the precoding value based at least in part on the set of third values and based at least in part on the set of second values and the set of third values satisfying a convergence criterion, and transmitting a communication using the precoding value.

With respect to process 700, in a third aspect, alone or in combination with one or more of the first and second aspects, the set of second values is based at least in part on the set of first values.

With respect to process 700, in a fourth aspect, alone or in combination with one or more of the first through third aspects, the set of first values is based on a previously received set of values associated with the set of second nodes (e.g., a previously received reliability value, estimated value, and/or CSI, associated with one or more nodes of the set of second nodes).

With respect to process 700, in a fifth aspect, alone or in combination with one or more of the first through fourth aspects, process 700 includes receiving a signal from the set of UEs, wherein the set of first values is based at least in part on the signal from the set of UEs.

With respect to process 700, in a sixth aspect, alone or in combination with one or more of the first through fifth aspects, the set of second values are based at least in part on signals received by the set of second nodes and transmitted by the set of UEs.

With respect to process 700, in a seventh aspect, alone or in combination with one or more of the first through sixth aspects, the set of first values is based at least in part on CSI associated with a particular UE, of the set of UEs, and each node of the first node and the set of second nodes.

With respect to process 700, in an eighth aspect, alone or in combination with one or more of the first through seventh aspects, the CSI associated with the particular UE is received from the particular UE.

With respect to process 700, in a ninth aspect, alone or in combination with one or more of the first through eighth aspects, the CSI associated with the particular UE is received from one or more of the set of second nodes.

With respect to process 700, in a tenth aspect, alone or in combination with one or more of the first through ninth aspects, the set of first values is based at least in part on a cross-correlation matrix associated with the first node, the set of second nodes, and the set of UEs. In some aspects, determining the set of first values (and/or the set of third values) based at least in part on the cross-correlation matrix associated with the first node, the set of second nodes, and the set of UEs may cause an iterative procedure used to determine the linear detection value and/or the precoding value to converge more quickly than other approaches. In some other aspects, the set of first value and/or the set of third values may be determined, at the first node, using a first set of CSI associated with only the first node and the set of UEs (and not the set of second nodes) and optionally using CSI associated with a given UE, of the set of UEs, and each node of the first node and the set of second nodes. In such aspects, signaling between the first node and the set of second nodes may be reduced relative to using the cross-correlation matrix, and security may be improved since the amount of information conveyed between the nodes may be reduced.

With respect to process 700, in an eleventh aspect, alone or in combination with one or more of the first through tenth aspects, the cross-correlation matrix is based at least in part on signaling between the first node and the set of second nodes via one or more connections between the first node and the set of second nodes.

With respect to process 700, in a twelfth aspect, alone or in combination with one or more of the first through eleventh aspects, the signaling includes at least one of one or more received signal samples associated with the set of UEs, or one or more values of the cross-correlation matrix.

With respect to process 700, in a thirteenth aspect, alone or in combination with one or more of the first through twelfth aspects, the transmission of the set of first values is based at least in part on a first iteration of an iterative procedure, and the transmission of the set of third values is based at least in part on a second iteration of the iterative procedure. For example, the set of third values may be based at least in part on a set of values determined at step 550 using the set of first values and/or the set of second values.

With respect to process 700, in a fourteenth aspect, alone or in combination with one or more of the first through thirteenth aspects, the set of first values are determined in parallel with the set of second values.

With respect to process 700, in a fifteenth aspect, alone or in combination with one or more of the first through fourteenth aspects, the set of second values are determined after the set of first values according to a sequence.

With respect to process 700, in a sixteenth aspect, alone or in combination with one or more of the first through fifteenth aspects, at least one of the first node or a second node of the set of second nodes includes at least one of a distributed unit, a radio head, or an access point.

With respect to process 700, in a seventeenth aspect, alone or in combination with one or more of the first through sixteenth aspects, the set of UEs includes K UEs, and the first node and the set of second nodes collectively comprise at least K nodes.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
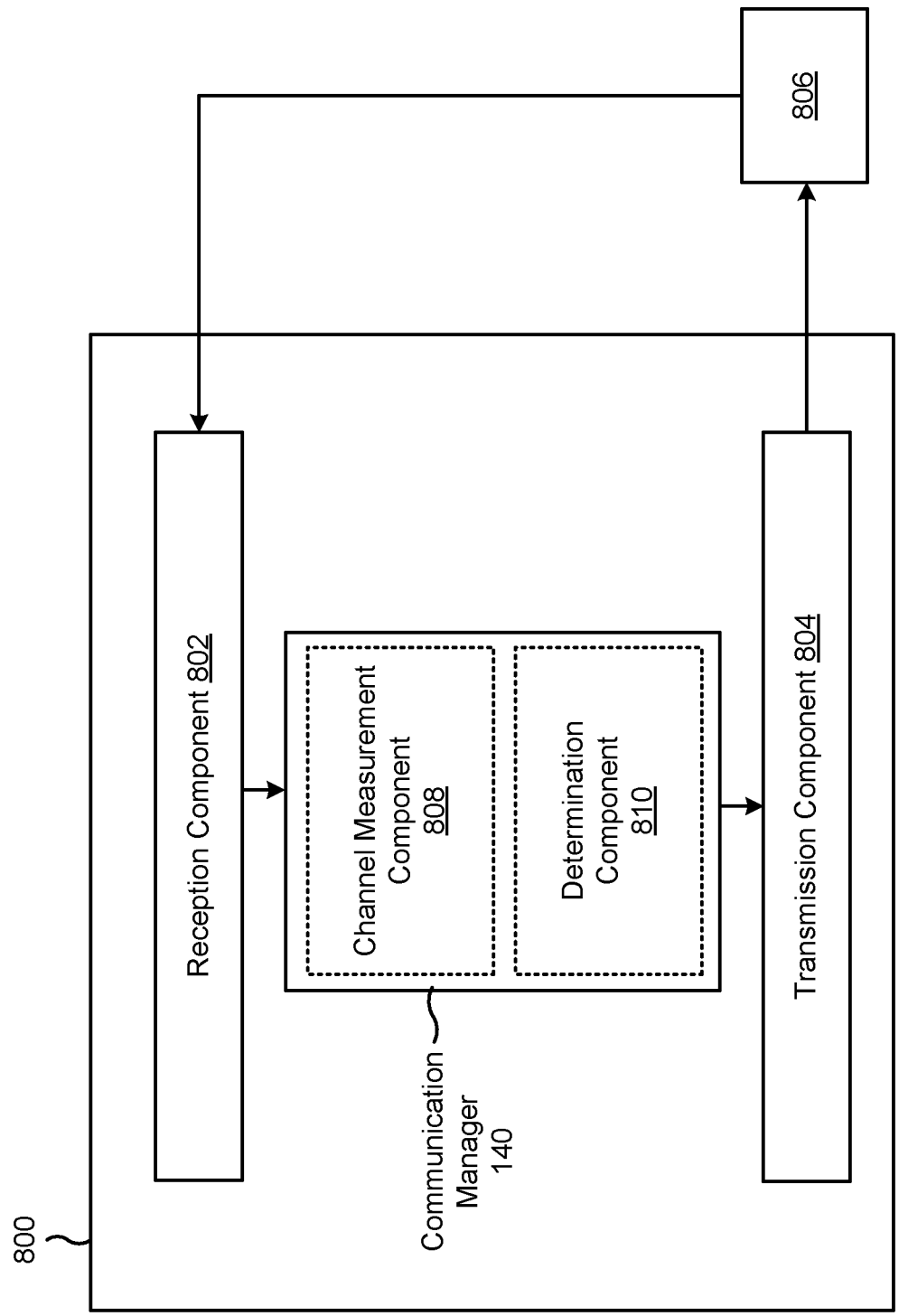
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a first node, or a first node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a channel measurement component 808 or a determination component 810, among other examples.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6 or a combination thereof. In some aspects, the apparatus 800 and/or one or more components shown in FIG. 8 may include one or more components of the first node described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the first node described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the first node described in connection with FIG. 2. In some aspects, the transmission component 804 may be co-located with the reception component 802 in a transceiver.

The transmission component 804 may transmit, to a set of second nodes, a set of first values indicating a first estimated value at the first node and a first reliability value associated with the first estimated value, the set of first values being based at least in part on channel state information (CSI) associated with the first node and a set of user equipments (UEs), wherein the first estimated value is associated with at least one of a linear detection value or a precoding value. The reception component 802 may receive, from the set of second nodes, a set of second values indicating a second estimated value at the second node and a second reliability value associated with the second estimated value, the set of second values being based at least in part on respective CSI and respective received signals of the set of second nodes. The transmission component 804 may transmit, to the set of second nodes, a set of third values indicating a third estimated value at the first node and a third reliability value associated with the third estimated value, the set of third values being based at least in part on CSI associated with the first node and the set of UEs. The channel measurement component 808 may determine CSI associated with the first node and at least one user equipment of the set of UEs.

The determination component 810 may determine the linear detection value based at least in part on the set of third values and based at least in part on the set of second values and the set of third values satisfying a convergence criterion.

The transmission component 804 may provide the linear detection value.

The determination component 810 may determine the precoding value based at least in part on the set of third values and based at least in part on the set of second values and the set of third values satisfying a convergence criterion.

The transmission component 804 may transmit a communication using the precoding value.

The reception component 802 may receive a signal from the set of UEs, wherein the set of first values is based at least in part on the signal from the set of UEs.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a first node, comprising: transmitting, to a set of second nodes, a set of first values indicating a first estimated value at the first node and a first reliability value associated with the first estimated value, the set of first values being based at least in part on channel state information (CSI) associated with the first node and a set of user equipments (UEs), wherein the first estimated value is associated with at least one of a linear detection value or a precoding value; receiving, from the set of second nodes, a set of second values indicating a second estimated value at the second node and a second reliability value associated with the second estimated value, the set of second values being based at least in part on respective CSI and respective received signals of the set of second nodes; and transmitting, to the set of second nodes, a set of third values indicating a third estimated value at the first node and a third reliability value associated with the third estimated value, the set of third values being based at least in part on CSI associated with the first node and the set of UEs.

Aspect 2: The method of Aspect 1, further comprising: determining the linear detection value based at least in part on the set of third values and based at least in part on the set of second values and the set of third values satisfying a convergence criterion; and providing the linear detection value.

Aspect 3: The method of any of Aspects 1-2, further comprising: determining the precoding value based at least in part on the set of third values and based at least in part on the set of second values and the set of third values satisfying a convergence criterion; and transmitting a communication using the precoding value.

Aspect 4: The method of any of Aspects 1-3, wherein the set of second values is based at least in part on the set of first values.

Aspect 5: The method of any of Aspects 1-4, wherein the set of first values is based on a previously received set of values associated with the set of second nodes.

Aspect 6: The method of any of Aspects 1-5, further comprising receiving a signal from the set of UEs, wherein the set of first values is based at least in part on the signal from the set of UEs.

Aspect 7: The method of any of Aspects 6, wherein the set of second values are based at least in part on signals received by the set of second nodes and transmitted by the set of UEs.

Aspect 8: The method of any of Aspects 1-6, wherein the set of first values is based at least in part on CSI associated with a particular UE, of the set of UEs, and each node of the first node and the set of second nodes.

Aspect 9: The method of any of Aspects 8, wherein the CSI associated with the particular UE is received from the particular UE.

Aspect 10: The method of any of Aspects 8, wherein the CSI associated with the particular UE is received from one or more of the set of second nodes.

Aspect 11: The method of any of Aspects 1-10, wherein the set of first values is based at least in part on a cross-correlation matrix associated with the first node, the set of second nodes, and the set of UEs.

Aspect 12: The method of any of Aspects 11, wherein the cross-correlation matrix is based at least in part on signaling between the first node and the set of second nodes via one or more connections between the first node and the set of second nodes.

Aspect 13: The method of any of Aspects 12, wherein the signaling includes at least one of: one or more received signal samples associated with the set of UEs, or one or more values of the cross-correlation matrix.

Aspect 14: The method of any of Aspects 1-13, wherein the transmission of the set of first values is based at least in part on a first iteration of an iterative procedure, and wherein the transmission of the set of third values is based at least in part on a second iteration of the iterative procedure.

Aspect 15: The method of any of Aspects 1-14, wherein the set of first values are determined in parallel with the set of second values.

Aspect 16: The method of any of Aspects 1-14, wherein the set of second values are determined after the set of first values according to a sequence.

Aspect 17: The method of any of Aspects 1-16, wherein at least one of the first node or a second node of the set of second nodes includes at least one of: a distributed unit, a radio head, or an access point.

Aspect 18: The method of any of Aspects 1-17, wherein the set of UEs includes K UEs, and wherein the first node and the set of second nodes collectively comprise at least K nodes.

Aspect 19: The method of any of Aspects 1-18, wherein the first reliability value is based at least in part on a matrix formed by a channel matrix between the first node, the set of second nodes, and the set of UEs, a transpose of the channel matrix, and one or more identity matrices.

Aspect 20: The method of any of Aspects 1-19, wherein the first estimated value is based at least in part on a received signal at the first node and a matrix, wherein the matrix is formed by a channel matrix between the first node, the set of second nodes, and the set of UEs, a transpose of the channel matrix, and one or more identity matrices.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first node, comprising:
   one or more memories; and
   one or more processors, coupled to the one or more memories, configured to:
      transmit, to a set of second nodes via at least one selfhaul connection between the first node and the set of second nodes, a set of first values indicating a first estimated value at the first node and a first reliability value associated with the first estimated value, the set of first values being based at least in part on channel state information (CSI) associated with the first node and a set of user equipments (UEs);
      receive, from the set of second nodes via the at least one selfhaul connection, a set of second values indicating a second estimated value at the set of second nodes and a second reliability value associated with the second estimated value, the set of second values being based at least in part on respective CSI of the set of second nodes;
      transmit, to the set of second nodes via the at least one selfhaul connection, a set of third values indicating a third estimated value at the first node and a third reliability value associated with the third estimated value, the set of third values being based at least in part on CSI associated with the first node and the set of UEs;
      receive, from the set of second nodes via the at least one selfhaul connection, a set of fourth values indicating a fourth estimated value at the set of second nodes and a fourth reliability value associated with the fourth estimated value, the set of fourth values indicating whether a convergence criterion of an iterative procedure is satisfied; and
      transmit, in response to the convergence criterion being satisfied and based at least in part on the set of fourth values, a communication including a linear detection value.

2. The apparatus of claim 1, wherein the one or more processors are further configured to:
   determine the linear detection value based at least in part on the set of third values and the set of fourth values.

3. The apparatus of claim 1, wherein the set of second values is based at least in part on the set of first values.

4. The apparatus of claim 1, wherein the set of first values is based on a previously received set of values associated with the set of second nodes.

5. The apparatus of claim 1, wherein the one or more processors are further configured to receive a signal from the set of UEs, wherein the set of first values is based at least in part on the signal from the set of UEs.

6. The apparatus of claim 5, wherein the set of second values are based at least in part on signals received by the set of second nodes and transmitted by the set of UEs.

7. The apparatus of claim 1, wherein the set of first values is based at least in part on CSI associated with a particular UE, of the set of UEs, and each node of the first node and the set of second nodes.

8. The apparatus of claim 7, wherein the CSI associated with the particular UE is received from the particular UE.

9. The apparatus of claim 7, wherein the CSI associated with the particular UE is received from one or more of the set of second nodes.

10. The apparatus of claim 1, wherein the set of first values is based at least in part on a cross-correlation matrix associated with the first node, the set of second nodes, and the set of UEs.

11. The apparatus of claim 10, wherein the cross-correlation matrix is based at least in part on signaling between the first node and the set of second nodes via the at least one selfhaul connection.

12. The apparatus of claim 11, wherein the signaling includes at least one of:
one or more signal samples, or
one or more values of the cross-correlation matrix.

13. The apparatus of claim 1, wherein the set of first values is determined in parallel with the set of second values.

14. The apparatus of claim 1, wherein the set of second values is determined after the set of first values according to a sequence.

15. The apparatus of claim 1, wherein at least one of the first node or a second node of the set of second nodes includes at least one of:
a distributed unit,
a radio head, or
an access point.

16. The apparatus of claim 1, wherein the set of UEs includes K UEs, and wherein the first node and the set of second nodes collectively comprise at least K nodes.

17. The apparatus of claim 1, wherein the first reliability value is based at least in part on a matrix formed by a channel matrix between the first node, the set of second nodes, and the set of UEs, a transpose of the channel matrix, and one or more identity matrices.

18. The apparatus of claim 1, wherein the first estimated value is based at least in part on a received signal at the first node and a matrix, wherein the matrix is formed by a channel matrix between the first node, the set of second nodes, and the set of UEs, a transpose of the channel matrix, and one or more identity matrices.

19. The apparatus of claim 1, wherein the iterative procedure is based at least in part on a CSI matrix (H), a received vector (r), and the convergence criterion, and wherein the linear detection value is expressed as:

$$\hat{x} = (H^T H + \sigma^2 I_K)^{-1} H^T r$$

wherein $H^T$ is a transpose of the CSI matrix (H), $\sigma^2$ is a noise variance, and $I_K$ is an identity matrix.

20. A method of wireless communication performed by a first node, comprising:
transmitting, to a set of second nodes via at least one selfhaul connection between the first node and the set of second nodes, a set of first values indicating a first estimated value at the first node and a first reliability value associated with the first estimated value, the set of first values being based at least in part on channel state information (CSI) associated with the first node and a set of user equipments (UEs);
receiving, from the set of second nodes via the at least one selfhaul connection, a set of second values indicating a second estimated value at the set of second nodes and a second reliability value associated with the second estimated value, the set of second values being based at least in part on respective CSI of the set of second nodes;
transmitting, to the set of second nodes via the at least one selfhaul connection, a set of third values indicating a third estimated value at the first node and a third reliability value associated with the third estimated value, the set of third values being based at least in part on CSI associated with the first node and the set of UEs;
receiving, from the set of second nodes via the at least one selfhaul connection, a set of fourth values indicating a fourth estimated value at the set of second nodes and a fourth reliability value associated with the fourth estimated value, the set of fourth values indicating whether a convergence criterion of an iterative procedure is satisfied; and
transmitting, in response to the convergence criterion being satisfied and based at least in part on the set of fourth values, a communication including a linear detection value.

21. The method of claim 20, further comprising:
determining the linear detection value based at least in part on the set of third values and the set of fourth values.

22. The method of claim 20, wherein the set of second values is based at least in part on the set of first values.

23. The method of claim 20, wherein the set of first values is based on a previously received set of values associated with the set of second nodes.

24. The method of claim 20, further comprising receiving a signal from the set of UEs, wherein the set of first values is based at least in part on the signal from the set of UEs.

25. The method of claim 20, wherein the iterative procedure is based at least in part on a CSI matrix (H), a received vector (r), and the convergence criterion, and wherein the linear detection value is expressed as:

$$\hat{x} = (H^T H + \sigma^2 I_K)^{-1} H^T r$$

wherein $H^T$ is a transpose of the CSI matrix (H), $\sigma^2$ is a noise variance, and $I_K$ is an identity matrix.

26. The method of claim 20, wherein the at least one selfhaul connection is a direct link between the first node and the set of second nodes that does not route communications via a network node.

27. A non-transitory computer-readable medium storing a set of instructions for wireless communication, the set of instructions comprising:
one or more instructions that, when executed by one or more processors of a first node, cause the first node to:
transmit, to a set of second nodes via at least one selfhaul connection between the first node and the set of second nodes, a set of first values indicating a first estimated value at the first node and a first reliability value associated with the first estimated value, the set of first values being based at least in part on channel state information (CSI) associated with the first node and a set of user equipments (UEs);
receive, from the set of second nodes via the at least one selfhaul connection, a set of second values indicating a second estimated value at the set of second nodes and a second reliability value associated with the second estimated value, the set of second values being based at least in part on respective CSI of the set of second nodes;
transmit, to the set of second nodes via the at least one selfhaul connection, a set of third values indicating a third estimated value at the first node and a third reliability value associated with the third estimated value, the set of third values being based at least in part on CSI associated with the first node and the set of UEs;

receive, from the set of second nodes via the at least one selfhaul connection, a set of fourth values indicating a fourth estimated value at the set of second nodes and a fourth reliability value associated with the fourth estimated value, the set of fourth values indicating whether a convergence criterion of an iterative procedure is satisfied; and transmit, in response to the convergence criterion being satisfied and based at least in part on the set of fourth values, a communication including a linear detection value.

28. The non-transitory computer-readable medium of claim 27, wherein the one or more instructions further cause the first node to:

determine the linear detection value based at least in part on the set of third values and the set of fourth values.

29. An apparatus for wireless communication, comprising:

means for transmitting, to a set of second nodes via at least one selfhaul connection between a first node and the set of second nodes, a set of first values indicating a first estimated value at the first node and a first reliability value associated with the first estimated value, the set of first values being based at least in part on channel state information (CSI) associated with the first node and a set of user equipments (UEs);

means for receiving, from the set of second nodes via the at least one selfhaul connection, a set of second values indicating a second estimated value at the set of second nodes and a second reliability value associated with the second estimated value, the set of second values being based at least in part on respective CSI of the set of second nodes;

means for transmitting, to the set of second nodes via the at least one selfhaul connection, a set of third values indicating a third estimated value at the first node and a third reliability value associated with the third estimated value, the set of third values being based at least in part on CSI associated with the first node and the set of UEs;

means for receiving, from the set of second nodes via the at least one selfhaul connection, a set of fourth values indicating a fourth estimated value at the set of second nodes and a fourth reliability value associated with the fourth estimated value, the set of fourth values indicating whether a convergence criterion of an iterative procedure is satisfied; and means for transmitting, in response to the convergence criterion being satisfied and based at least in part on the set of fourth values, a communication including a linear detection value.

30. The apparatus of claim 29, wherein the set of second values is based at least in part on the set of first values.

* * * * *